F. A. FOX.
ATTACHMENT FOR TIRE TREADS.
APPLICATION FILED OCT. 9, 1908.

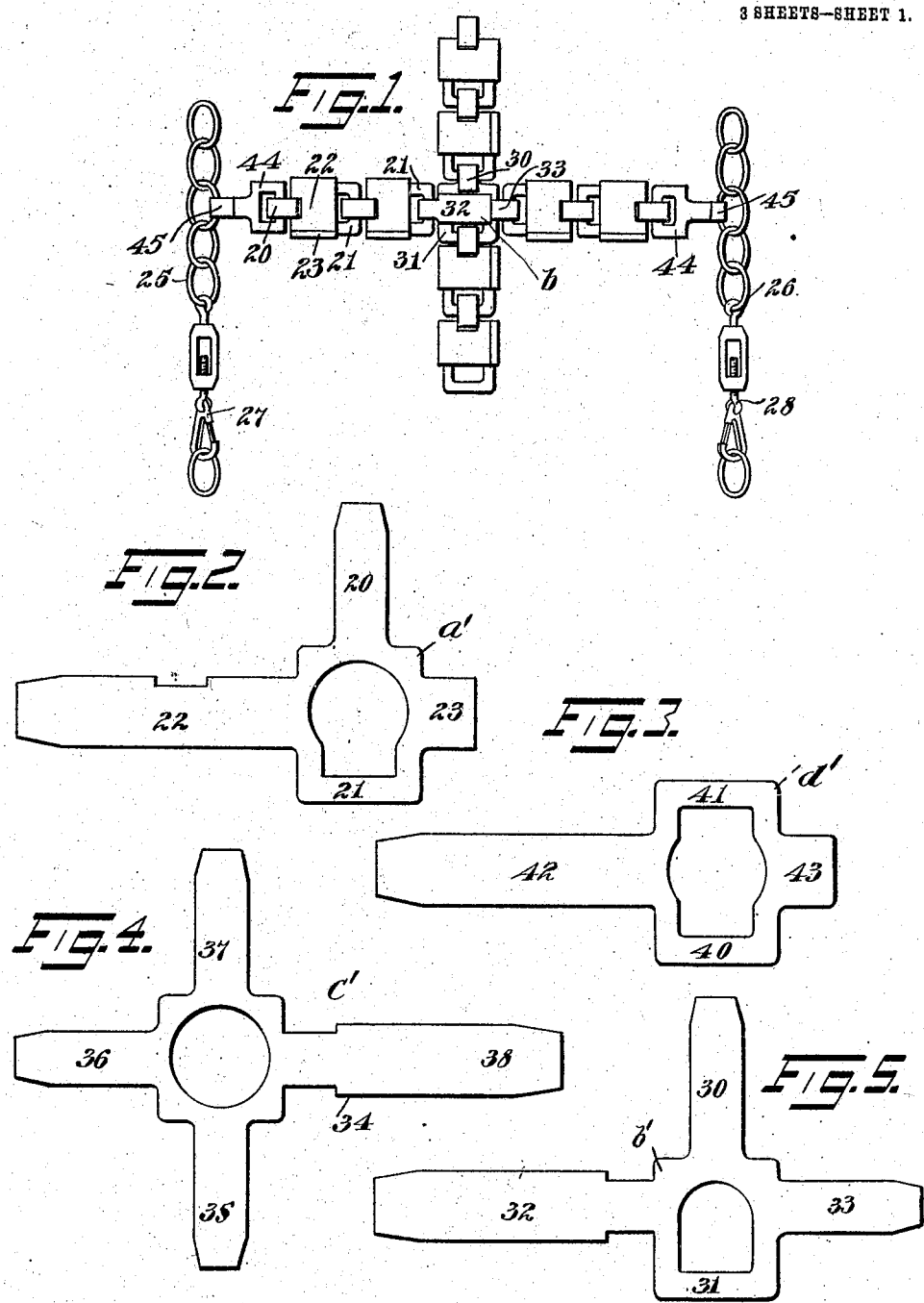

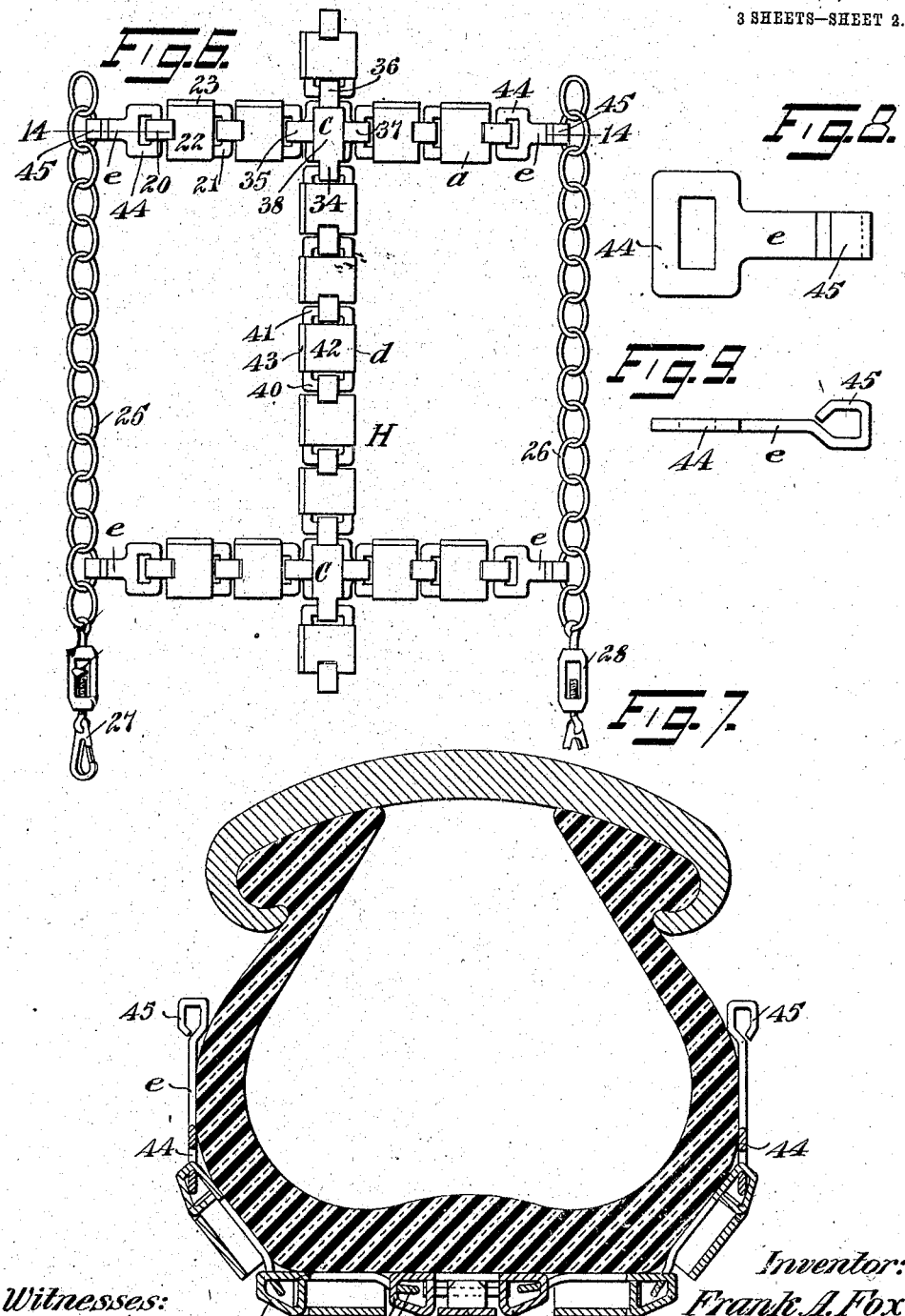

915,841.

Patented Mar. 23, 1909.
3 SHEETS—SHEET 3.

Witnesses:
C. C. Fuss,
H. D. Penney

Inventor:
Frank A. Fox,
By his Attorney,
F. H. Richards.

UNITED STATES PATENT OFFICE.

FRANK A. FOX, OF NEW YORK, N. Y., ASSIGNOR TO FOX METALLIC TIRE BELT COMPANY, OF NEW YORK, N. Y., A CORPORATION OF NEW YORK.

ATTACHMENT FOR TIRE-TREADS.

No. 915,841.      Specification of Letters Patent.      Patented March 23, 1909.

Application filed October 9, 1908. Serial No. 456,880.

*To all whom it may concern:*

Be it known that I, FRANK A. FOX, a citizen of the United States, residing in New York city, in the county of New York and State of New York, have invented certain new and useful Improvements in Attachments for Tire-Treads, of which the following is a specification.

This invention relates to an anti-skid device for tires especially when formed of rubber, and has for its object to provide an improved form of tire that will prevent slippage of the wheel in the direction of the movement of the vehicle, and which also has means for effectually preventing side skidding of the car.

Figure 10:
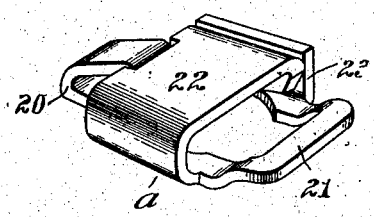
Figure 11:
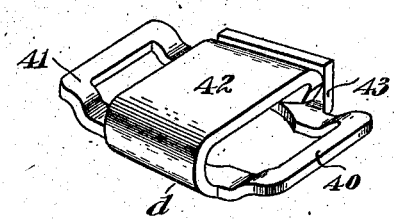
Figure 12:
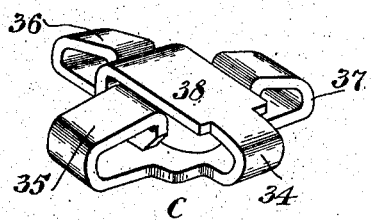
Figure 13:
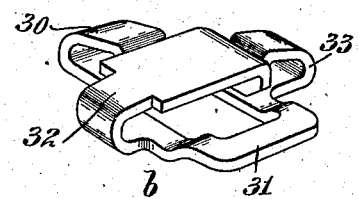
Figure 14:
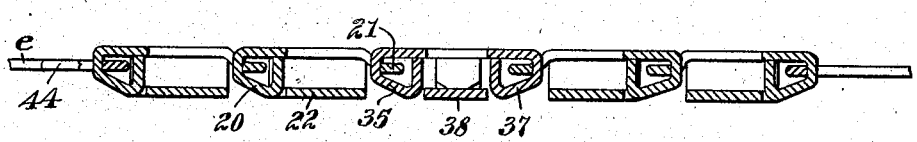
Figure 15:
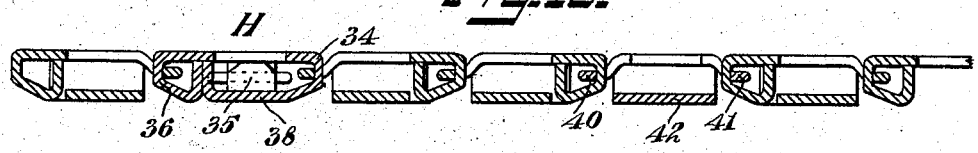
Figure 16:
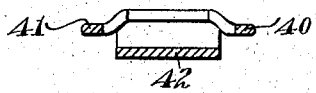
Figure 17:
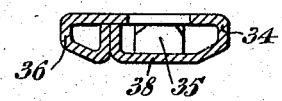
Figure 18:
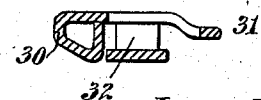

In the accompanying drawings representing embodiments of my invention, Figure 1 shows a fragmentary portion of the device.
Figs. 2, 3, 4 and 5 show blanks for several forms of links used. Fig. 6 shows a modified form of device. Fig. 7 is a transverse section through a tire with the device attached. Figs. 8 and 9 show in plan and elevation attaching links between the cross members and the side chains. Fig. 10 shows one of the links forming the cross chains and also longitudinal chains. Fig. 11 shows a modified link having two eye portions. Fig. 12 shows another form of link having four hook portions. Fig. 13 shows another form of link having one eye portion and three hook portions. Fig. 14 is a section on the line 14—14 indicated in Fig. 6. Fig. 15 is a section through a portion of the longitudinal chain. Fig. 16 is a section through the link indicated in Fig. 11. Fig. 17 is a section of the link shown in Fig. 12; and Fig. 18 is a section of the link indicated in Fig. 13.

The present invention is composed of a number of independent or separated cross chains or members formed of links that are preferably similar to those forming subject matter of an application filed by me on the 10th day of October, 1908, Serial No. 457,100. One of these links *a* is shown in Fig. 10, and is formed from a blank *a'* shown in Fig. 2, that comprises a tongue portion 20 on one side and an eye portion 21 on the opposite side, that is engaged by the tongue portion of an adjacent link, as shown in Figs. 1, 6 and 14. The link is provided with a tread portion 22 bent over substantially parallel with the base with the extremity bent down to engage the base and support the tread portion, and the end portion is protected by an up-turned piece 23. A series of these members extend across the tread at different places between the side members 25 and 26 that may be any suitable link chain, the ends being removably connected by hooks 27 and 28 in the usual manner for attachment and removal of the device.
The longitudinal tread chain denoted generally by H is preferably formed in precisely the same manner. But the intersecting link, that is common to both the longitudinal member and the side members respectively, is differently constructed whereby it can be readily connected with these same links without any alteration thereof.

In the form shown in Fig. 1, the link shown in Fig. 13 is employed, which link is denoted by *b*. This link has the usual hook portion 30 on one side and the eye portion 31 on the other side and is thereby connected with the links *a*, of the longitudinal chain as shown in Fig. 1. But this link *b* has a hook portion 32 extended across the intermediate portion to form the tread portion and then bent downward to engage the base. On the opposite side is a hook portion 33. These two opposite hook portions engage the eye portions 21 of the link *a*, that are in reverse position on opposite sides of the longitudinal member, as shown in Fig. 1. With the exception of this intermediate link that is common to both the cross chains and the longitudinal chains, all the other links are identical. The blank *b'* for this link *b* is shown in Fig. 5.

In the modification shown in Fig. 6 the intermediate link *c*, shown separately in Fig. 12, is formed with practically four hook portions, three of them 35, 36 and 37 being substantially identical, while the hook portion 38 is extended across the link substantially parallel with the base to form a tread portion whose extremity is bent down to engage the base and support the tread portion. The two similar hook portions 35 and 37 connect with the adjacent links of the cross chains, while the hook portions 36 and 34 connect with the eye portions of the transverse links. But this will cause the links of the longitudinal member on opposite sides of the cross member to have reverse positions. This will necessitate an intermediate link in the longitudinal member between each cross member to connect the reverse links. This is accomplished by the link member d shown in Fig. 11, that is formed of the blank d' set forth in Fig. 3. This comprises two opposite eye portions 40 and 41 instead of the hook and eye portions shown in the link a. This link d is provided with the transverse tread portion 42, and the protecting lug 43 similar to the lug in link a.

In both of these forms of tread devices, the end link of the side members has a suitable connecting link with the side chain, such as a link e having an eye portion 44 engaged by the hooks 20 of the links a, and a hook portion 45 that engages the side chain 25 and 26. When the tire engages the ground with this chain attached, the tread portion will flatten somewhat as indicated in Fig. 7, and practically three links of the cross member will engage the road. The longitudinal member will also engage the ground for a certain length according to the amount of flat portion of the tire. The longitudinal chain will always have a number of links on the road, and will effectually prevent side skidding of the tire. It will be observed that the joints of the hooks and eyes are loose fitting so that a certain amount of side play is permitted. By this means a slight twist can be given by the chain that will increase its grip on the road. It will be further observed that the tread portion on each of the links is situated above and beyond the hook portion or the eye portion of the link upon which the strain is received, and that this tread portion can be worn thin or through before the connecting hook and eye portion will be severed or even weakened, thereby greatly lengthening the life of the tire.

Having thus described my invention, I claim:

1. Tread attachment for tires comprising cross members, and a longitudinal member, the members being formed of links having an eye portion and a hook portion engaging the eye portion of an adjacent link, the links being provided with a loop portion extending upward and across between the hook and eye portion with the extremity bent downward to engage the base, the said cross members and longitudinal member having common articulating links at the intersection comprising hook and eye portions on two opposite sides engaging the respective hook and eye portions of adjacent longitudinal links, the intersecting link having a hook portion at one side engaging the link of the cross member, said latter hook being extended across the link intermediate of said hook and eye portion to form a tread portion with the extremity bent downward to engage the base, the intersecting link also having the hook portion on the side opposite the said tread hook portion engaging the eye portion of the adjacent cross member link, and means for attachment to the wheel.

2. Tread attachment for tires comprising cross members, and a longitudinal member, the members being formed of links having an eye portion and a hook portion engaging the eye portion of an adjacent link, the links being provided with a loop portion extending upward and across between the hook and eye portion with the extremity bent downward to engage the base, the said cross members and longitudinal member having common articulating links at the intersection comprising articulating portions on two opposite sides engaging the respective adjacent links, the intersecting link having a hook portion at one side engaging the link of a said member, said latter hook being extended across the link intermediate of said articulating portion to form a tread portion with the extremity bent downward to engage the base, the intersecting link also having the hook portion on the side opposite the said tread hook portion engaging the eye portion of an adjacent link of one of said members, and means for attachment to a wheel.

FRANK A. FOX.

Witnesses:
FRED. J. DOLE,
WILLIAM H. REID.